United States Patent [19]
Klar

[11] 3,780,292
[45] Dec. 18, 1973

[54] APPARATUS FOR MEASURING THE NEUTRON FLUX IN A NUCLEAR REACTOR

[75] Inventor: Erich Klar, Erlangen, Germany

[73] Assignee: Siemens Aktiengesellschaft, Berlin, Germany

[22] Filed: Mar. 17, 1972

[21] Appl. No.: 235,787

Related U.S. Application Data

[63] Continuation of Ser. No. 72,460, Sept. 15, 1970, abandoned.

[30] Foreign Application Priority Data

Sept. 16, 1969 Germany.................. P 19 46 758.4

[52] U.S. Cl...............250/390, 176/19 R, 176/19 J
[51] Int. Cl.......................... G01t 3/00, G21c 17/00
[58] Field of Search.................. 250/83.1; 176/19 R, 176/19 J

[56] References Cited
UNITED STATES PATENTS 3,160,567 12/1964 Steinberg et al............... 250/83.1 X
3,375,370 3/1968 Hilborn.............................. 250/83.1
3,565,760 2/1971 Parkos et al.................... 250/83.1 X
3,578,562 5/1971 Johnson et al................. 250/83.1 X

*Primary Examiner*—Archie R. Borchelt
*Attorney*—Arthur E. Wilfond et al.

[57] ABSTRACT

An apparatus for measuring the neutron flux in the active region of a nuclear reactor has a plurality of individual neutron absorbing probes insertable into the active region of the reactor. One of the probes extends over the entire length of the active region and the remainder of the probes extend over progressively shorter lengths respectively of the active region. The probes have respective portions outside of the active region and a cable connection means is connected to these portions.

4 Claims, 2 Drawing Figures

APPARATUS FOR MEASURING THE NEUTRON FLUX IN A NUCLEAR REACTOR

This is a continuation, of application Ser. No. 72,460, filed Sept. 15, 1970, now abandoned.

My invention relates to a measuring apparatus for measuring the neutron flux in the active region of a nuclear reactor.

It is known to provide ionization chambers or so-called self-powered detectors for measuring the flux distribution in the core or active region of a nuclear reactor. Each probe is responsive to the flux distribution in only a limited portion of the height of the core, whereby the measuring signal is transmitted via a cable to an evaluation instrument or signal analyzer or means disposed outside of the core. In the cable there is generated a high spurious current by means of gamma radiation and fast neutron radiation. The spurious current can constitute up to as much as 25 percent of the usable signal and thereby considerably distort the measurement. In this connection, the spurious current is also substantially dependent upon the depth to which the probe extends into the core, that is, from the length of the cable portion disposed in the core. To reduce this spurious current there have been developed cables having ancillary spurious current compensation means. However, this measure has been successful in only partially solving this problem.

Accordingly, it is an object of my invention to provide an apparatus that precludes spurious currents from occurring in the connection cable connected to the measuring probes.

It is another object of the invention to provide a measuring apparatus for measuring the neutron flux distribution over the entire active region of a nuclear reactor.

According to a feature of my invention I provide a plurality of individual neutron absorbing probes that are insertable into the active region of a nuclear reactor. One of these probes extends over the entire length of the active region while the remainder of the probes extend over progressively shorter lengths respectively of the active region. In addition, the probes have respective portions outside of the active region and a cable connection means is connected to these portions. It has been shown especially advantageous to use so-called self-powered detectors.

Because in the entire active region of the reactor, only the electron sensitive portion of the probe is inserted, spurious currents do not occur in the cable. According to a further feature of the invention, means are provided for ascertaining the neutron flux step-wise over the entire height of the core by forming the current difference between each two individual probes of different length.

The invention will now be described with reference to the drawing wherein.

Figure 1:
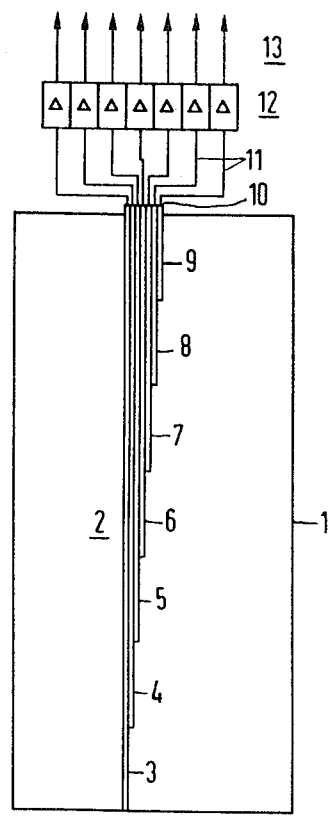
FIG. 1 illustrates a measuring apparatus according to the invention for measuring the neutron flux in the active region of a nuclear reactor.

Referring to FIG. 1, the measuring apparatus according to the invention covers the entire active region 1 of a nuclear reactor. In illustrated embodiment, the apparatus comprises seven individual probes 3 to 9 of which the first probe 3 extends to the base of the active region while the remaining probes 4 to 9 cover progressively shorter lengths respectively of the active region. Probes 3 to 9 are arranged so that the connection means 10 for the connecting cable are disposed outside of the active region 1 at approximately the same height. The connection cable 11 is not exposed to any neutron and gamma radiation; this means that no spurious currents can occur in the cable. The measuring signals are transmitted to a signal analyzer means via amplifiers 12.

By using so-called self-powered detectors beta particles are set free by the neutron bombardment. Self-powered detectors usually comprise a steel casing with a mineral insulated cobalt inner conductor. This moved charge provides a current that is directly proportional to the neutron flux. By forming the current difference from each two individual probes that differ in their length by the same amount, there is obtained a determination of flux distribution over the entire height of the core or active region.

Figure 2:
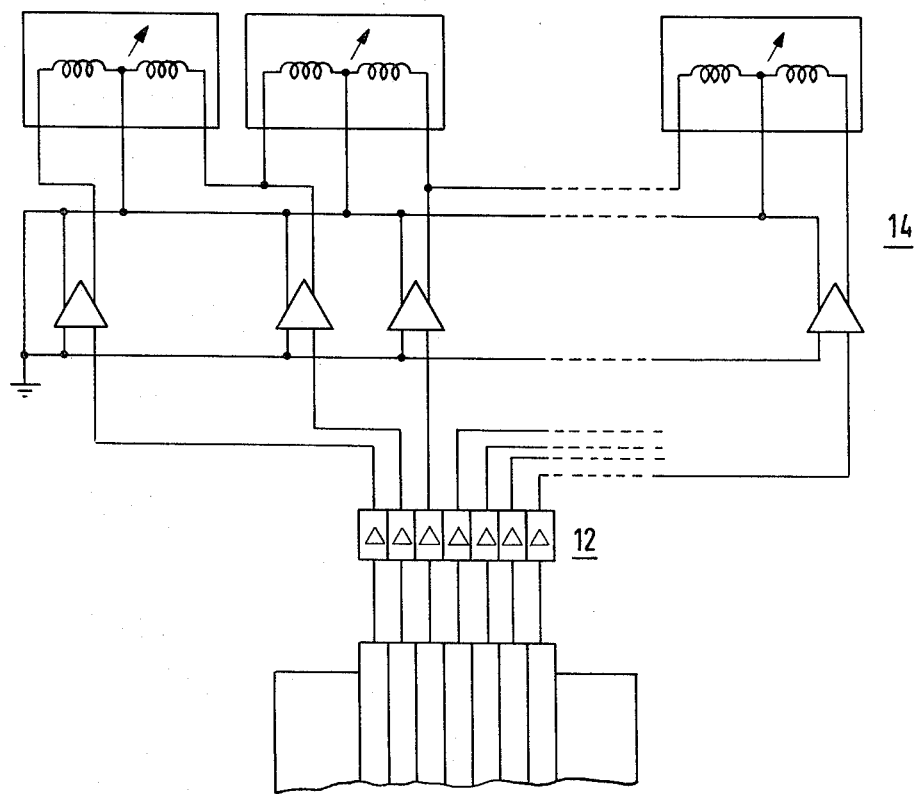
FIG. 2 illustrates the measuring apparatus of FIG. 1 provided with current-difference forming stages according to another embodiment of the invention.

Referring to FIG. 2, the measuring apparatus of FIG. 1 is provided with current-difference forming stages 14 of which each is connected to two of the probes of respectively different lengths, the difference forming means in totality being connected to all the probes along the entire height of the active region of the reactor.

The use of self-powered detectors provides a considerably less costly solution as opposed to using the known ionization chambers, since the burning off of the detectors as opposed to the ionization chambers is less by a power of 10, whereby the calibration is also made substantially easier.

To those skilled in the art, it will be obvious upon a study of this disclosure that my invention permits of various modifications with respect to features and hence, that the invention may be given embodiments other than particularly illustrated and described herein without departing from the essential features of the invention and within the scope of the claims annexed hereto.

I claim:

1. Apparatus for measuring the neutron flux in an active region of a nuclear reactor wherein neutron radiation is generated, comprising a plurality of individual neutral absorbing probes disposed in fixed spatial relation to the active region of the reactor, said probes extending over respectively different lengths of said active region, said probes having respective end portions extending away from and being outside of the active region, and cable connection means connected to said end portions and located entirely outside of the active region and away from the neutron radiation.

2. In an apparatus according to claim 1, each one of said probes being a self-powered detector.

3. Apparatus according to claim 1, comprising current-difference forming stages of which each is connected to two of said probes of respectively different lengths, said difference forming stages in totality being connected to all of said probes along the entire height of the reactor active region.

4. In an apparatus according to claim 1, one of said probes extending over the entire length of the active region, the remainder of said plurality of said probes extending over progressively shorter lengths respectively of the active region.

* * * * *